US006536314B1

(12) United States Patent
Forster et al.

(10) Patent No.: US 6,536,314 B1
(45) Date of Patent: Mar. 25, 2003

(54) DEVICE FOR CONTINUOUS CHIPLESS SEPARATION OF SINGLE IDENTICAL RINGS FROM TUBULAR WORKPIECES

(75) Inventors: Wilfried Forster, Gröditz (DE); Roland Stephan, Riesa (DE); Dr.-Ing. Joachim Schlegel, Freiberg (DE)

(73) Assignee: Mannesmann AG, Düsseldorf (DE)

( * ) Notice: Subject to any disclaimer, the term of this patent is extended or adjusted under 35 U.S.C. 154(b) by 4 days.

(21) Appl. No.: 09/655,440

(22) Filed: Sep. 5, 2000

(30) Foreign Application Priority Data

Sep. 17, 1999 (DE) .......................... 199 46 111

(51) Int. Cl.⁷ .............. B21H 1/06; B23B 5/36
(52) U.S. Cl. .................. 82/46; 82/58; 82/84; 82/92
(58) Field of Search .................. 82/46, 47, 54, 82/57, 58, 59, 70.2, 84, 85, 92; 72/68, 70, 71; 83/17, 19, 54

(56) References Cited

U.S. PATENT DOCUMENTS 3,470,775 A * 10/1969 Marcovitch .......... 82/83
5,152,047 A * 10/1992 Kojima et al. ........ 29/411
5,868,050 A * 2/1999 Feldmeier ............ 82/47

FOREIGN PATENT DOCUMENTS

| DE | OS 1 602 950 | 5/1970 |
| DE | 44 15 091 C1 | 1/1996 |
| DE | 195 41 135 C2 | 4/1997 |
| DE | 197 08 473 A1 | 8/1998 |
| WO | WO 95/29777 A1 | 11/1995 |

* cited by examiner

Primary Examiner—Henry Tsai
(74) Attorney, Agent, or Firm—Henry M. Feiereisen

(57) ABSTRACT

A device for continuous chipless separation of single identical rings from a tubular workpiece, includes at least two cutting rollers which are placed about the tubular workpiece, and which operate in a same direction and are interconnected by a positive engagement. Each cutting roller includes a basic body having opposite axial ends defining an entry zone and an exit zone, respectively. The basic body has a slip bevel at the entry zone, a calibrating section at the exit zone, and a cutting screw disposed between the slip bevel and the calibrating section and including a helical main thread portion with a conical entry part and a substantially cylindrical primary part in succession of the entry part, whereby the cutting screw has at least one additional thread which is disposed between threads of the main thread portion of the cutting screw.

30 Claims, 4 Drawing Sheets

DEVICE FOR CONTINUOUS CHIPLESS SEPARATION OF SINGLE IDENTICAL RINGS FROM TUBULAR WORKPIECES

CROSS-REFERENCES TO RELATED APPLICATIONS

This application claims the priority of German Patent Application, Serial No. 199 46 111.2, filed Sep. 17, 1999, the subject matter of which is incorporated herein by reference.

BACKGROUND OF THE INVENTION

The present invention relates to a device for continuous chipless separation of identical rings from a tubular workpiece.

A device for the continuous chipless separation of single identical rings from tubular workpieces is described in International PCT patent application WO 95/29777 and includes three cutting rollers which are driven in a same direction and arranged around the tubular workpiece being worked on. The cutting rollers are interconnected through positive engagement and include a cylindrical basic body which has axial ends defining a slip bevel and a calibrating section, respectively, and a threaded section with thread-shaped cutting edges disposed between the slip bevel and the calibrating section. The cutting edges include, as viewed in longitudinal section, a pointed cutting head and a cutting foot with flanks that are oriented substantially perpendicular to the respective roller axis. The flanks have a width which increases from entry to exit. The contour in the base between the cutting edges of the cutting rollers is substantially parallel to the roller axis, and the diameter of each cutting roller increases from beginning toward the end. This conventional device suffers shortcomings because only in theory can it separate rings of an outer diameter of at most 80 mm and a width of at most 40 mm. In fact, as tests have shown, the limits of the device are already reached when separating rings that have an outer diameter of 65 mm and a width of 25 mm. Moreover, this device is not able to separate asymmetric rings.

SUMMARY OF THE INVENTION

It is thus an object of the present invention to provide an improved device for continuous chipless separation of identical rings from a tubular workpiece, obviating the aforestated drawbacks.

In particular, it is an object of the present invention to provide an improved device for continuous chipless separation of identical rings from a tubular workpiece, which allows a separation of rings of greater outer diameter and greater width than previously possible.

It is still another object of the present invention to provide an improved device for continuous chipless separation of asymmetric rings from a tubular workpiece.

These objects, and others which will become apparent hereinafter, are attained in accordance with the present invention by providing at least two cutting rollers which are placed around the tubular workpiece and operate in a same direction and which are interconnected by a positive engagement, whereby each cutting roller includes a basic body having opposite axial ends defining an entry zone and an exit zone, respectively, with the basic body having a slip bevel at the entry zone, a calibrating section at the exit zone, and a cutting screw disposed between the slip bevel and the calibrating section and including a helical main thread portion with a conical entry part and a substantially cylindrical primary part in succession of the entry part, whereby the cutting screw has at least one further thread disposed between threads of the main thread portion of the cutting screw.

The arrangement of at least one additional thread between threads of the main thread portion of the cutting screw may be realized in the entry part or in the primary part. Suitably, when provided in the primary part, the at least one additional thread may have a configuration intended to profile the outer contour of the ring. An arrangement of at least one additional thread in the entry part improves gripping conditions for grabbing the tubular workpiece and reduces wear of the highly stressed threads, whereby the outer diameter of the additional thread is suitably equal or smaller than a diameter of the primary part, thereby ensuring that the lead of the main thread portion, which is determinative for the width of the ring, remains unchanged and effective. As soon as the tubular workpiece is fully grabbed, the additional thread is no longer required and may run out. Depending on the width and the diameter of the ring being separated, two or more additional threads may be provided.

According to another feature of the present invention, at least one additional thread may be formed in the entry part whereas still another further thread is formed in the primary part for profiling the outer contour of a ring being produced, whereby the additional thread in the entry part merges into the further thread in the primary part, suitably in the transition zone between the entry part and the primary part. Thus, in this fashion not only is the device capable to separate individual rings but the rings can also be provided with a symmetric or asymmetric outer profile. Optionally, the additional thread in the primary part may or may not adjoin a neighboring thread of the main thread portion of the cutting screw.

Evidently, the possibilities with respect to the addition of additional threads are infinite. For example, the additional thread in the primary part may be formed with a cutting thread so that not only the outer contour of the ring can be profiled but also the ring itself can be split into two halves to thereby produce two asymmetric inner rings. Other examples may include the provision of two or more additional threads in the entry part that merge into two or more additional threads in the primary part, respectively, or the provision of two or more additional threads in the entry part that merge into a single additional thread in the primary part.

With a device according to the present invention, larger and wider rings than was possible heretofore can now be processed in chipless fashion from a tubular workpiece, including the production of rings with an outer contour or even a split of a ring in two halves.

BRIEF DESCRIPTION OF THE DRAWING

The above and other objects, features and advantages of the present invention will be more readily apparent upon reading the following description of preferred exemplified embodiments of the invention with reference to the accompanying drawing, in which.

DETAILED DESCRIPTION OF PREFERRED EMBODIMENTS

Figure 1:
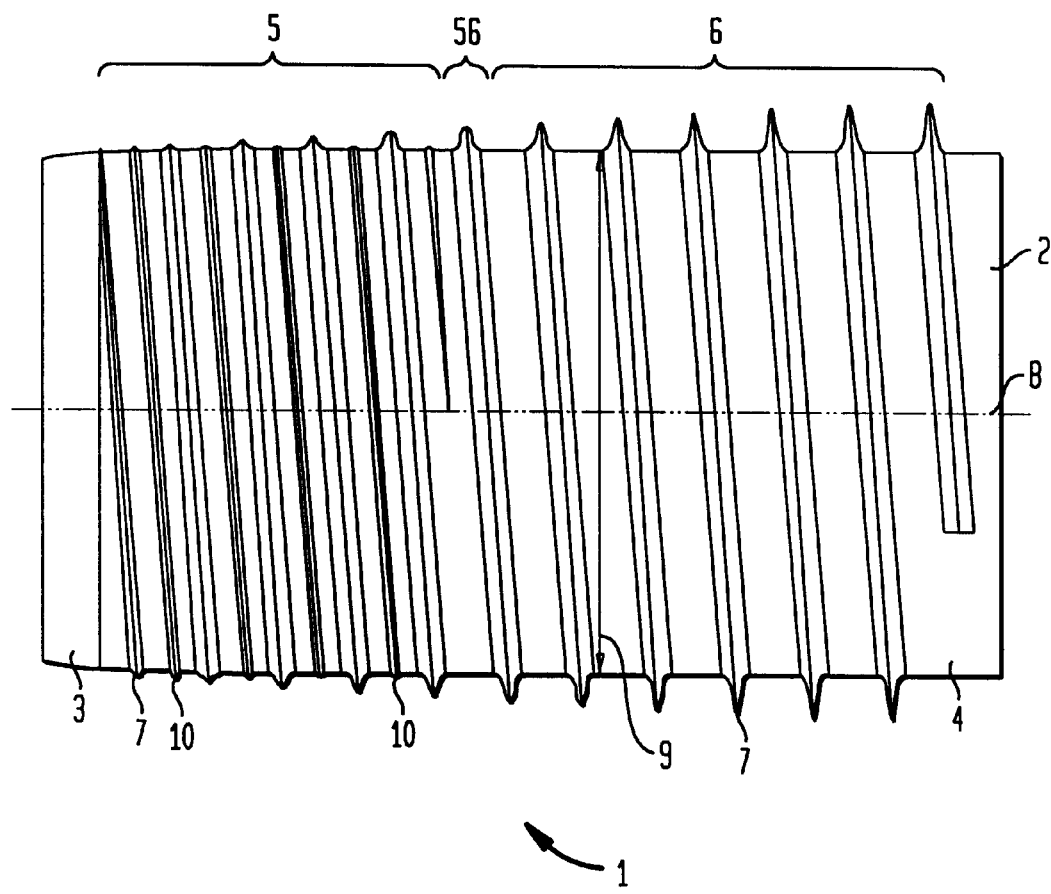
FIG. 1 is a longitudinal section of a first embodiment of a cutting roller according to the present invention.

Throughout all the Figures, same or corresponding elements are generally indicated by same reference numerals.

Turning now to the drawing, and in particular to FIG. 1, there is shown a longitudinal section of a first embodiment of a cutting roller according to the present invention, generally designated by reference numeral 1. The cutting roller 1 includes a cylindrical basic body 2 defining a longitudinal axis 8 and having axial ends which define a slip bevel 3 on an entry side and a calibrating section 4 on an exit side. Disposed between the slip bevel 3 and the calibrating section 4 is a cutting screw with a helical main thread portion 7 which is comprised of a conical entry part 5 and a generally cylindrical primary part 6 immediately following the entry part 5. Formed in the entry part 5 is a further thread 10 which, on the entry side, has an outer diameter that is at most equal to or smaller than a diameter 9 of the basic body 2 in the area of the primary part 6, and, on the exit side, corresponds to the diameter of the basic body 2 in a transition zone 56 between the entry part 5 and the primary part 6. In this way, the lead of the main thread portion 7 remains fully effective to separate from a tubular workpiece (not shown) a ring 12, shown in FIG. 2, and, as being the factor that is determinative for the width, to provide the ring with a desired width 11. Suitably, the further thread 10 is placed precisely in midsection between two neighboring threads of the main thread portion 7. The thread 10 may have a pointed head portion, with the width of the base of the thread 10 remaining constant.

Persons skilled in the art will understand that the illustration in FIG. 1 of only one additional thread 10, is done by way of example only. Of course, it is certainly within the scope of the present invention to provide two or more such threads depending on the width 11 of the ring 12 being separated.

Figure 2:
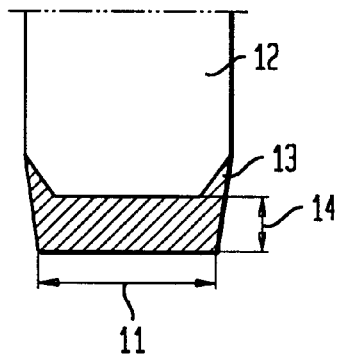
FIG. 2 is a cross sectional view of one half of a ring separated from a tubular workpiece by using the cutting roller of FIG. 1.

FIG. 2 is a cross sectional illustration of one half of the ring 12 which has been separated from the tubular workpiece by using the cutting roller 1. A characteristic feature of chipless separation of rings 12 from a tubular workpiece, which is heated before the separation process, is the formation of an inner burr 13 as the separation is implemented without support of an internal tool. The ring 12 has a thickness 14 which substantially corresponds to the original wall thickness of the tubular workpiece.

Figure 3:
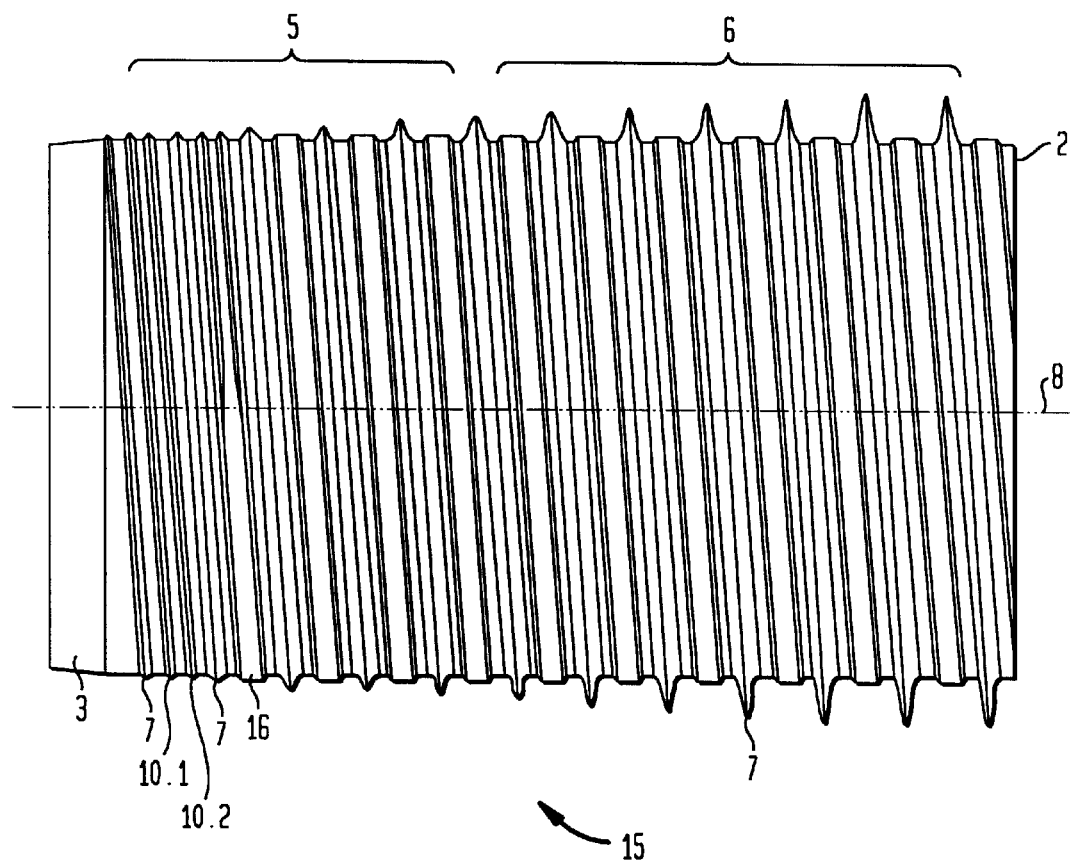
FIG. 3 is a longitudinal section of a second embodiment of a cutting roller according to the present invention.
Figure 4:
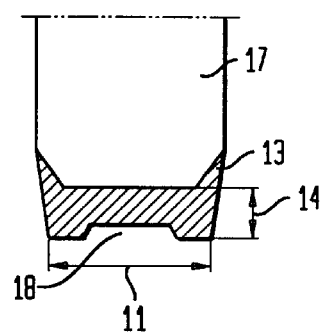
FIG. 4 is a cross sectional view of one half of a ring separated from a tubular workpiece and formed with an outer profile by using the cutting roller of FIG. 3.

Turning now to FIG. 3, there is shown a longitudinal section of a second embodiment of a cutting roller according to the present invention, generally designated by reference numeral 15. Parts corresponding with those in FIG. 1 are denoted by identical reference numerals and not explained again. In this embodiment, the entry part 5 is provided with two additional threads 10.1, 10.2 located between threads of the main thread portion 7 and optionally having different initial heights. The additional threads 10.1, 10.2 do not run out but merge into a further thread 16 by which the outer contour of a ring 17, shown in FIG. 4, can be profiled. The thread 16 has a height which steadily increases from an entry side until reaching a final profile height at the exit side.

By means of the cutting roller 15, the ring 17 is separated from a tubular workpiece (not shown) and has a recess 18 which may be used as track for an inner ring. Advantageously, the complexity of subsequent machining operations is hereby significantly reduced as a major part of material is already pushed aside through the formation of the recess 18.

Figure 5:
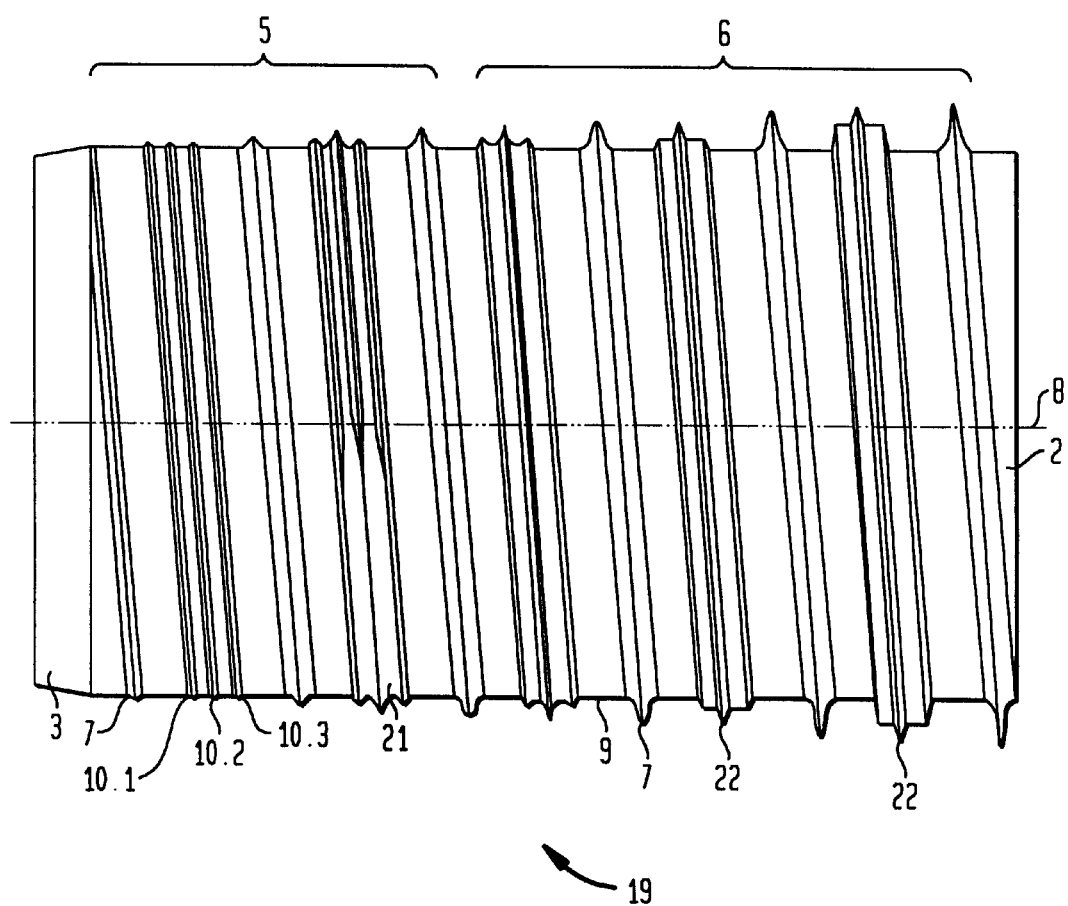
FIG. 5 is a longitudinal section of a modification of the cutting roller of FIG. 3.
Figure 6:
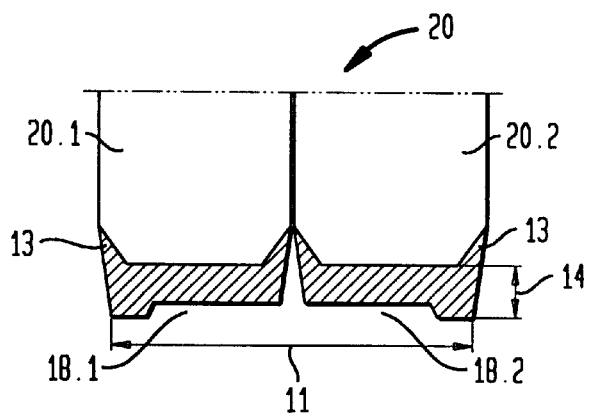
FIG. 6 is a cross sectional view of one half of a ring separated from a tubular workpiece with the cutting roller of FIG. 5 and split into two halves, which are mirror images of one another.

FIG. 5 shows a further variation of a cutting roller according to the present invention, generally designated by reference numeral 19. Parts corresponding with those in FIGS. 1 and 3 are denoted by identical reference numerals and not explained again. In this embodiment, the cutting roller 19 has a substantial lead of the threads of the main thread portion 7 in order to produce a ring 20 of substantial width 11, as shown in FIG. 6. The entry part 5 is formed with at least three additional threads 10.1, 10.2, 10.3 which merge into a thread 21 by which the outer contour of the ring 20 can be profiled. The thread 21 is provided with a cutting thread 22 for splitting the separated ring 20 into two halves 20.1, 20.2, with each of the halves 20.1, 20.2 formed with a recess 18.1, 18.2. In this way, asymmetric inner rings can be produced for subsequent use, for example, in a double ring bearing.

Figure 7:
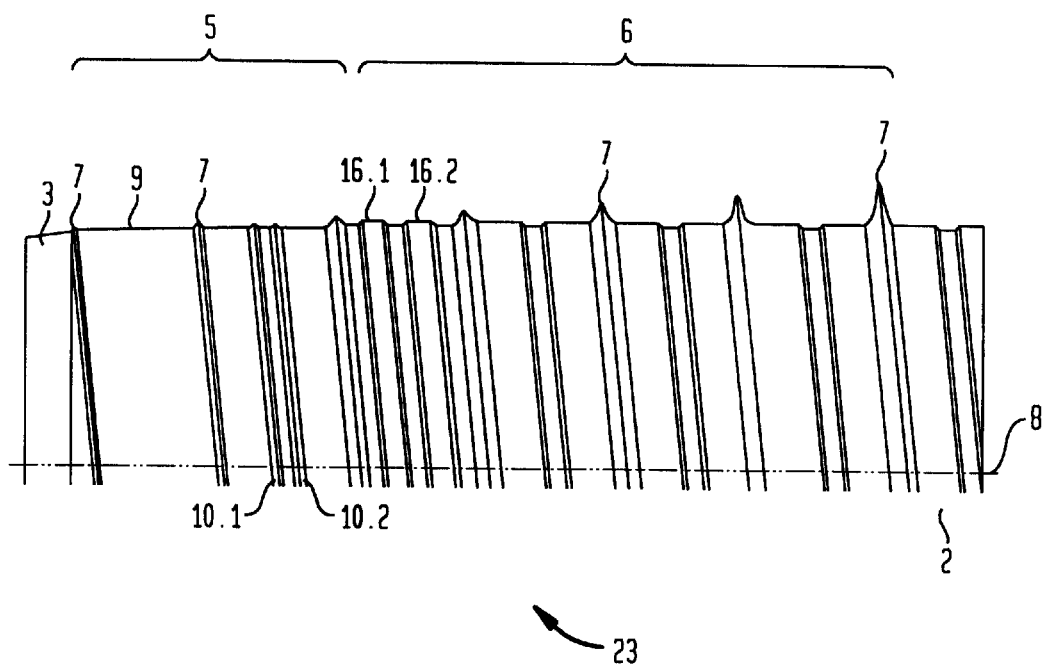
FIG. 7 is a longitudinal section of another variation of the cutting roller of FIG. 3.
Figure 8:
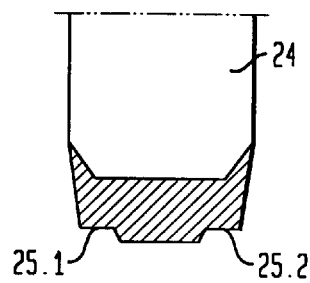
FIG. 8 is a cross sectional view of one half of a ring separated from a tubular workpiece by using the cutting roller of FIG. 7.

FIG. 7 shows a further variation of a cutting roller according to the present invention, generally designated by reference numeral 23. In this embodiment, the entry part 5 has two additional threads 10.2, 10.2 which merge, in the transition zone 56 between the entry part 5 and the primary part 6, into respective threads 16.1, 16.2 for profiling an outer contour of a ring 24, shown in FIG. 8. Unlike the cutting portion 7, whereby this union is retained to the end of the cutting roller 23. As shown in FIG. 8, the ring 24 separated by the cutting roller 23 has marginal areas of reduced diameter to provide shoulders 25.1, 25.2.

While the invention has been illustrated and described as embodied in a device for continuous chipless separation of single identical rings from a tubular workpiece, it is not intended to be limited to the details shown since various modifications and structural changes may be made without departing in any way from the spirit of the present invention.

What is claimed as new and desired to be protected by Letters Patent is set forth in the appended claims.

What is claimed is:

1. A device for continuous chipless separation of identical rings from a tubular workpiece, comprising at least two cutting rollers placed about the tubular workpiece, said at least two cutting rollers operating in a same direction, each of said cutting rollers including a basic body having opposite axial ends defining an entry zone and an exit zone, respectively, said basic body having a slip bevel at the entry zone, a calibrating section at the exit zone, and a cutting screw disposed between the slip bevel and the calibrating section and including a helical main thread portion with a conical entry part and a substantially cylindrical primary part in succession of the entry part, said cutting screw having at least one additional first thread disposed between threads of the main thread portion of the cutting screw in immediate proximity of the slip bevel for assisting the cutting screw in grabbing the tubular workpiece in the entry zone to thereby reduce wear of the cutting screw.

2. The device of claim 1 wherein the helical main thread portion has a transition zone between the conical entry part and the substantially cylindrical primary part, wherein the at least one additional first thread is formed in the entry part and has an outer diameter which on an entry side is equal to or smaller than a diameter of the primary part, and on an exit side corresponds to a diameter of the basic body in the transition zone between the entry part and primary part.

3. The device of claim 2 wherein the cutting screw has at least one further second thread formed in the primary part for profiling an outer contour of a ring being produced, said at least one further second thread having a diameter which increases progressively to a predetermined profile height.

4. The device of claim 3 wherein the at least one additional first thread merges into the at least one further second thread in the transition zone between the entry part and the primary part.

5. The device of claim 2 wherein the entry part of the cutting screw has two or more of said at least one additional first thread of different initial heights.

6. The device of claim 4 wherein the at least one further second thread is formed with a cutting thread for splitting the ring into two halves, said cutting thread defined by a height substantially corresponding to the height of the main thread portion.

7. The device of claim 1 wherein the at least one additional first thread has a lead which matches a lead of the main thread portion.

8. The device of claim 2 wherein the at least one additional first thread in the entry part has a lead which is greater than a lead of the main thread portion.

9. The device of claim 2 wherein the at least one additional first thread in the entry part is disposed in midsection between neighboring threads of the main thread portion.

10. The device of claim 2 wherein the at least one additional first thread in the entry part has a pointed head portion with a constant base width.

11. The device of claim 4 wherein the cutting screw has another one of said at least one additional first thread for merging with another one of said at least one further second thread.

12. The device of claim 4 wherein the cutting screw has several of said at least one additional first thread for merging with the at least one further second thread.

13. The device of claim 4 wherein the cutting screw has several of said at least one additional first thread for merging with several of said at least one further second thread in one-to-one correspondence.

14. The device of claim 4 wherein the cutting screw has two or more of said at least one additional first thread for merging with the at least one further second thread which adjoins a neighboring thread of the main thread portion of the cutting screw.

15. The device of claim 4 wherein the cutting screw has two or more of said at least one additional first thread for merging with at least two of said at least one further second thread in one-to-one correspondence whereby the at least two of said at least one further second thread adjoin a neighboring thread of the main thread portion of the cutting screw.

16. A cutting roller for use in a device for continuous chipless separation of identical rings from a tubular workpiece, said cutting roller comprising a basic body having opposite axial ends defining an entry zone and an exit zone, respectively, said basic body having a slip bevel at the entry zone, a calibrating section at the exit zone, and a cutting screw disposed between the slip bevel and the calibrating section and including a helical main thread portion with a conical entry part and a substantially cylindrical primary part in succession of the entry part, said cutting screw having at least one additional first thread disposed between threads of the main thread portion of the cutting screw in immediate proximity of the slip bevel for assisting the cutting screw in grabbing the tubular workpiece in the entry zone to thereby reduce wear of the cutting screw.

17. The cutting roller of claim 16 wherein the helical main thread portion has a transition zone between the conical entry part and the substantially cylindrical primary part, wherein the at least one additional first thread is formed in the entry part and has an outer diameter which on an entry side is equal to or smaller than a diameter of the primary part, and on an exit side corresponds to a diameter of the basic body in the transition zone between the entry part and primary part.

18. The cutting roller of claim 17 wherein the cutting screw has at least one further second thread formed in the primary part for profiling an outer contour of a ring being produced, said at least one further second thread having a diameter which increases progressively to a predetermined profile height.

19. The cutting roller of claim 18 wherein the at least one additional first thread merges into the at least one further second thread in the transition zone between the entry part and the primary part.

20. The cutting roller of claim 17 wherein the entry part of the cutting screw has two or more of said at least one additional first thread of different initial heights.

21. The cutting roller of claim 19 wherein the at least one further second thread is formed with a cutting thread for splitting the ring into two halves, said cutting thread defined by a height substantially corresponding to the height of the main thread portion.

22. The cutting roller of claim 16 wherein the at least one additional first thread has a lead which matches a lead of the main thread portion.

23. The cutting roller of claim 17 wherein the at least one additional first thread in the entry part has a lead which is greater than a lead of the main thread portion.

24. The cutting roller of claim 17 wherein the at least one additional first thread in the entry part is disposed in midsection between neighboring threads of the main thread portion.

25. The cutting roller of claim 17 wherein the at least one additional first thread in the entry part has a pointed head portion with a constant base width.

26. The cutting roller of claim 19 wherein the cutting screw has another one of said at least one additional first thread for merging with another one of said at least one further second thread.

27. The cutting roller of claim 19 wherein the cutting screw has several of said at least one additional first thread for merging with the at least one further second thread.

28. The cutting roller of claim 19 wherein the cutting screw has several of said at least one additional first thread for merging with several of said at least one further second thread in one-to-one correspondence.

29. The cutting roller of claim 19 wherein the cutting screw has two or more of said at least one additional first thread for merging with the at least one further second thread which adjoins a neighboring thread of the main thread portion of the cutting screw.

30. The cutting roller of claim 19 wherein the cutting screw has two or more of said at least one additional first thread for merging with at least two of said at least one further second thread in one-to-one correspondence whereby the at least two of said at least one further second thread adjoin a neighboring thread of the main thread portion of the cutting screw.

* * * * *